(12) United States Patent
Park

(10) Patent No.: US 7,780,104 B2
(45) Date of Patent: Aug. 24, 2010

(54) BAIT CASTING REEL WITH SPOOL TURNING DIAL

(75) Inventor: Cheol-woo Park, Irvine, CA (US)

(73) Assignee: Silver Star Co., Ltd, Busan (KR)

( * ) Notice: Subject to any disclaimer, the term of this patent is extended or adjusted under 35 U.S.C. 154(b) by 0 days.

(21) Appl. No.: 12/482,034

(22) Filed: Jun. 10, 2009

(65) Prior Publication Data
US 2010/0140385 A1   Jun. 10, 2010

(30) Foreign Application Priority Data
Dec. 5, 2008   (KR) .................. 10-2008-0123403

(51) Int. Cl.
*A01K 89/01*   (2006.01)
(52) U.S. Cl. .............. 242/249; 242/310; 242/312; 242/282
(58) Field of Classification Search ............ 242/247, 242/257, 282, 249, 256, 265, 310, 312
See application file for complete search history.

(56) References Cited

U.S. PATENT DOCUMENTS

| | | | | |
|---|---|---|---|---|
| 873,784 A | * | 12/1907 | Reichardt | 242/256 |
| 2,428,908 A | * | 10/1947 | Cooper et al. | 242/256 |
| 2,591,338 A | * | 4/1952 | Cooper | 242/256 |
| 3,446,453 A | * | 5/1969 | Pachner | 242/256 |
| 4,850,548 A | * | 7/1989 | Faulkner | 242/256 |
| 5,443,218 A | * | 8/1995 | Ciocca | 242/256 |
| 7,216,825 B2 | * | 5/2007 | Oishi et al. | 242/247 |
| 7,290,727 B1 | * | 11/2007 | Matsuda | 242/238 |

* cited by examiner

*Primary Examiner*—Emmanuel M Marcelo
(74) *Attorney, Agent, or Firm*—Hyra IP, PLC; Clifford D. Hyra

(57) ABSTRACT

A bait reel equipped with a turning dial controls the winding of the fishing line by controlling the revolution of the spool during fishing. The bait reel equipped with a turning dial has a dial for spooling connected by the handle axle and the combination of gears. Therefore, it enables the user to manually fine-tune the revolution of the spool, makes the structure of the reel simple even when the turning dial is added by making the guide support add the turning dial to the handle axle so the fishing line can be smoothly and stably wound on or released from the spool, and makes it easy to change and maintain the turning dial by fixing the turning dial to the side cover located, with the possibility of detaching and re-attaching, on the opposite side of the handle.

12 Claims, 4 Drawing Sheets

BAIT CASTING REEL WITH SPOOL TURNING DIAL

This application claims the benefit of South Korean patent application No. 10-2008-0123403, filed Dec. 5, 2008, which is hereby incorporated by reference in its entirety.

TECHNICAL FIELD OF THE INVENTION

The present invention deals with a bait reel with a turning dial. More specifically, it deals with a bait reel equipped with a turning dial that enables the user to manually control the revolution of the spool by being equipped with a turning dial connected by the handle axle and the combination of gears.

BACKGROUND OF THE INVENTION

A bait reel is used for lure fishing that catches fish using fake bait, and it makes the fishing line smoothly wounded on and released from the spool that can make free revolutions and reverse revolutions.

The technologies related to this kind of bait reel include the U.S. Pat. No. 7,216,825 "Fishing Reel" which incorporates an additional, supplementary revolution control device on top of a handle that rotates the spool. This kind of supplementary revolution control device is a type of toggle switch connected to the handle axle. With this device, the spool rotates in a pre-determined angle when the user triggers off the device once. Therefore, the user can wind the fishing line in the pre-determined length by operating the supplementary revolution control device with a simple movement of the finger of the hand that holds the reel, free from the bothersome rotating of the handle.

However, the aforementioned supplementary revolution control device in the form of a toggle switch only uniformly rotates the spool in a pre-determined angle, making it impossible to fine-tune the amount of the revolution of the spool. It also has the problem that it is complicated to manufacture and assemble the reel because an additional structure should be provided to install the supplementary revolution control device to the reel.

SUMMARY

The present invention provides a bait reel equipped with a turning dial that controls the winding of the fishing line by controlling the revolution of the spool during fishing. The bait reel equipped with a turning dial according to the present invention has a dial for spooling connected by the handle axle and the combination of gears. Therefore, it enables the user manually fine-tune the revolution of the spool; makes the structure of the reel simple even when the turning dial is added by making the guide support add the twitching dial to the handle axle so the fishing line can be smoothly and stably wound on or released from the spool; and makes it easy to change and maintain the turning dial by fixing the turning dial to the side cover located, with the possibility of detaching and re-attaching, on the opposite side of the handle.

The bait reel equipped with a turning dial according to the present invention consists of a handle, a spool, a casing, a guide support, and a turning dial. The handle rotates as the user turns it; the spool rotates as it reacts to the revolution of the handle because it is equipped with a spool axle connected to the handle axle of the handle; and the casing fixes the handle and the spool so they can rotate. Having the shape of a bar, the guide support is installed away from the spool and parallel to the spool axle in the casing. On the both ends of the guide support are the gear steps installed, and the gear step installed on one end is connected to the connection gear combined with the handle axle. The guide entrance has a hole in it where the fishing line wound on the spool is inserted and passes through so it can slide on the guide support. The turning dial has the connection gear on one side which is meshed with the gear step installed on the other side of the guide support. It is fixed to the casing with a part of it sticking out of the casing with the possibility of revolving against the casing so the user can turn it. In the bait reel equipped with the turning dial according to the present invention, the turning dial rotates the spool as many as the times of the number of the gear cogs of the pinion installed between the handle axle and the spool axle by transmitting the rotary motion of the turning dial to the handle axle through the guide support.

EXPLANATION OF THE NUMBERS FOR THE MAIN COMPONENTS IN THE DRAWINGS

Figure 1:
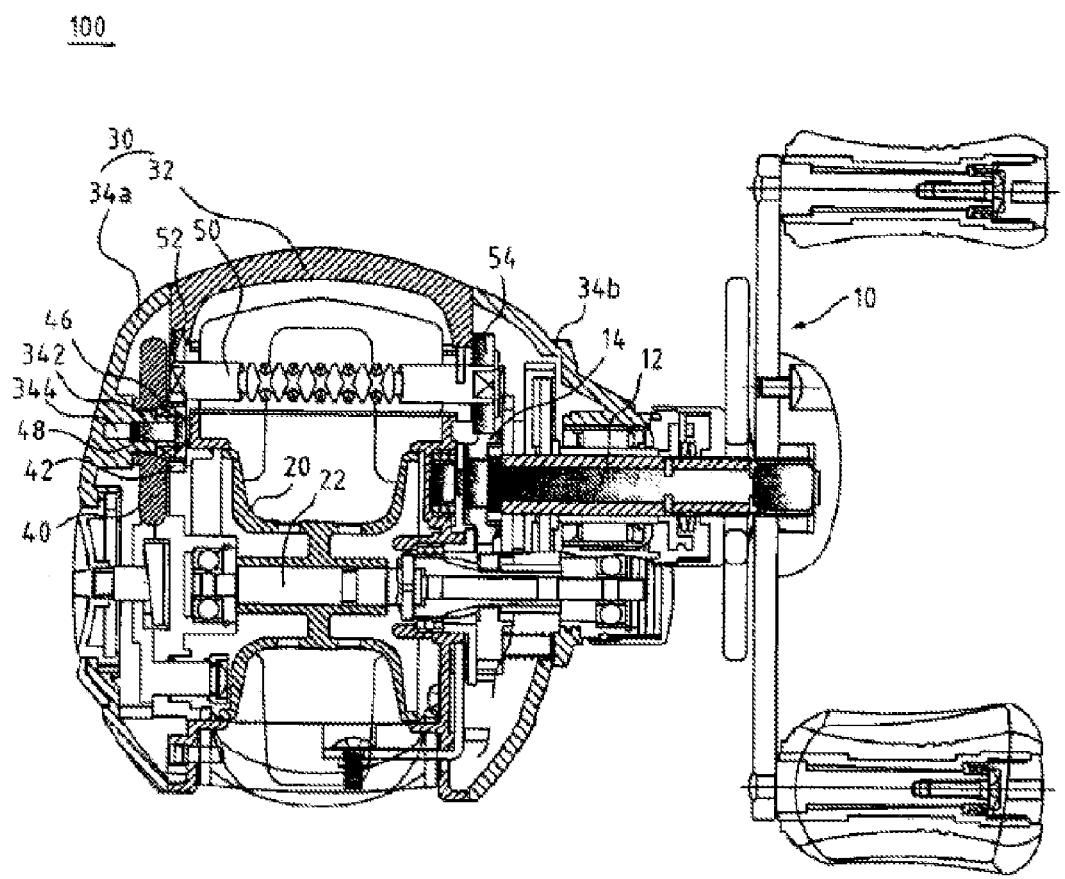
FIG. 1 is a drawing showing the main parts of the bait reel equipped with a turning dial according to a desirable application example of the present invention.

| 10: | Handle | 12: | Handle Axle |
|---|---|---|---|
| 14: | Connection Gear | 20: | Spool |
| 22: | Spool Axle | 24: | Pinion |
| 30: | Casing | 32: | Main Frame |
| 34a, 34b: | Side Cover | 342: | Projecting Part |
| 344: | Connection Groove | 40: | Turning dial |
| 42: | Connection Gear | 44: | Bearing Fixing Hole |
| 46: | Bearing for Dial | 48: | Fixing Bolt |
| 50: | Guide Support | 52, 54: | Gear Steps |
| 56: | Pipe | 60: | Guide Entrance |
| 62: | Hole | 64: | Stopper |
| 66: | Stopper Cap Screw | 100: | Bait Reel |

DETAILED DESCRIPTION

Therefore, the present invention intends to provide a bait reel equipped with a new type of a turning dial that that improves the aforementioned problem of the conventional technology and enables the user manually fine-tune the amount of the revolution of the spool during fishing by being equipped with a turning dial connected by the handle axle and the combination of gears.

The present invention also intends to provide a bait reel equipped with a new type of a turning dial that enables the user to effectively lure fish by pulling the fake bait in lure fishing as a result of the fact that the user can smoothly and stably maintain the tense of the fishing line that becomes loose during fishing after it is cast and released from the spool.

Especially, the present invention intends to provide a bait reel equipped with a new type of a turning dial that makes the structure of the reel simple even when a turning dial is added by making the guide support installed on the bait reel for a smoother and more stable winding and unwinding of the fishing line wound on the spool of the bait reel connect the turning dial to the handle axle.

Also, another purpose of the present invention is to provide a bait reel equipped with a new type of a turning dial that is easy to change and maintain by attaching it to the side cover located on the other side of the handle with the possibility of detaching and reattaching it.

According to the characteristics of the present invention to achieve the aforementioned purposes, the bait reel for fishing of the present invention is characterized in that it includes a handle that rotates as the user turns it; a spool that rotates as it reacts to the revolution of the handle because it is equipped with a spool axle connected to the handle axle of the handle; a casing that fixes the handle and the spool so they can rotate; a guide support with the shape of a bar that is installed away from the spool and parallel to the spool axle in the casing; a guide entrance that has a hole in it where the fishing line wound on the spool is inserted and passes through so it can slide on the aforementioned guide support; and a turning dial that has the connection gear on one side which is meshed with the gear steps installed on the other side of the guide support and is fixed to the casing with a part of it sticking out of the casing with the possibility of revolving against the casing so the user can turn it. It is also characterized in that the turning dial rotates the spool as many as the times of the number of the gear cogs of the pinion installed between the handle axle and the spool axle by transmitting the rotary motion of the turning dial is transferred to the handle axle through the guide support.

The aforementioned casing in the bait reel equipped with a turning dial according to the present invention is characterized in that it consists of a main frame that enables the installation of the aforementioned spool in the space formed in the middle, and the removable side covers that makes the outer shape of the bait reel on the both sides of the aforementioned main frame, that the aforementioned handle is installed in such a way that it sticks out of one of the two side covers, and that the aforementioned turning dial is removable together with the other side cover as a one unit by being fixed to that side cover with the possibility of revolution.

The aforementioned side cover, in the bait reel equipped with a turning dial according to the present invention, installed on the opposite side of the aforementioned handle is characterized in that it has a projecting part with a connection groove on its inner side; the aforementioned turning dial has a bearing fixing hole in the middle so the bearing for dial can be fixed; the aforementioned removable turning dial is fixed to the aforementioned side cover installed on the opposite side of the handle as the aforementioned bearing for the dial that is fixed in the aforementioned fixing hole is inserted in the projecting part of the aforementioned side cover.

In the bait reel equipped with a turning dial according to the present invention, the turning dial is engaged by the handle axle and the gear combination, which enables the user to manually fine-tune the revolutions. Therefore, it is effective for luring fish and capturing those caught with the fishing line. Further, because the turning dial can be detached from the side cover that makes the casing, it is easy to change and maintain. Also, because of the simple structure of connecting the turning dial to the handle axle using the guide support, manufacturing and assembly are very simple.

And as the tension of the fishing line is maintained because of the fine-tuning of the fishing line through the bait reel equipped with a turning dial of the present invention, the user can effectively lure fish pulling the fake bait in lure fishing.

The bait reel (100) for fishing is used in the lure fishing where the angler catches fish using fake baits. The present invention deals with a bait reel (100) for the aforementioned fishing where a turning dial (40) is installed that controls the winding of the fishing line by controlling the revolution of the spool (20) during fishing. The bait reel (100) equipped with the turning dial according to the present invention is characterized in that it enables the user to manually fine-tune the revolution of the spool (20) thanks to the turning dial (40) connected by the handle axle (12) and the gear combination, and that the structure is simplified as the guide support (50) installed in the bait reel (100) connects the turning dial (40) to the handle axle (12) so that the fishing line wound on the spool of the bait reel (100) can be smoothly and stably wound or released.

The following is more detailed explanations of the invention with reference to the attached FIGS. 1 through 4. In the following explanations, the illustrations and explanations on the structures and operations of the ordinary bait reels that are commonly known to those who work in this field are simplified or omitted. Especially, illustrations and detailed explanations for technical structures and operations of the elements that are not directly related to the technical characteristics of the present invention are omitted, and only those that are directly related to the technical structures of the present invention are briefly illustrated or explained.

Figure 2:
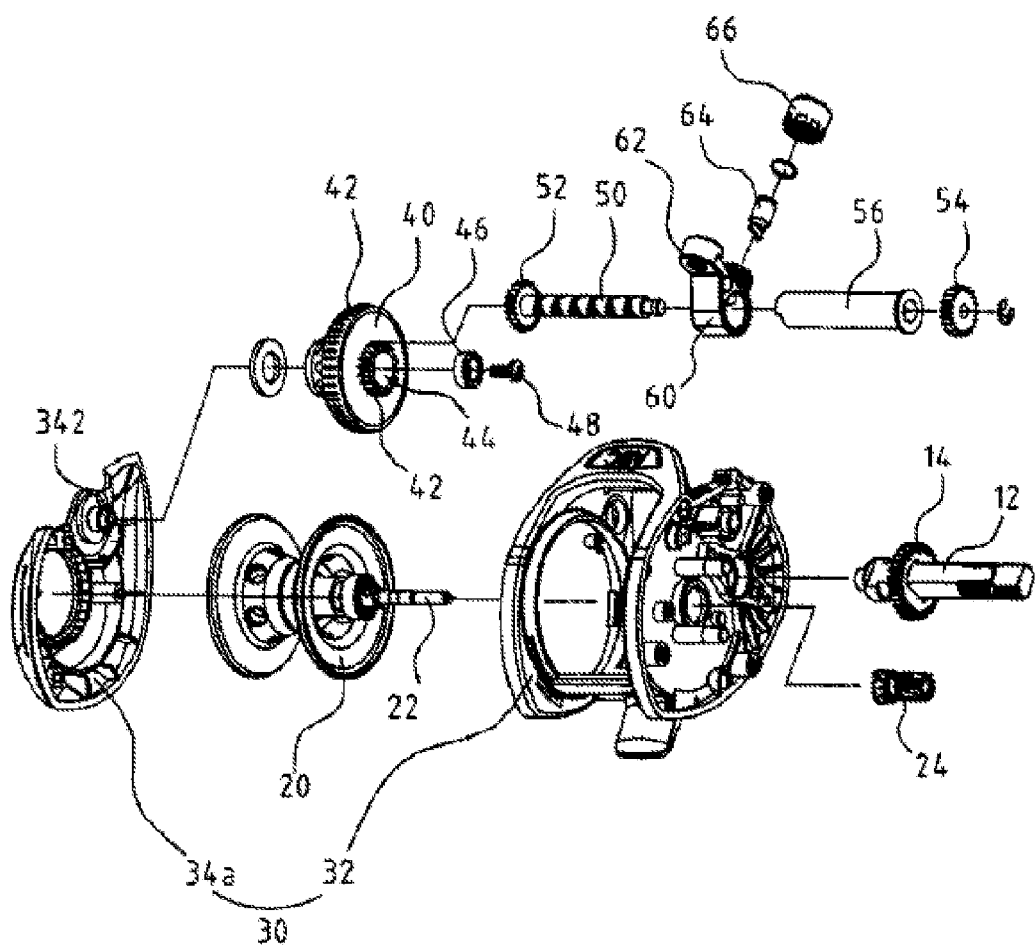
FIG. 2 is a oblique view for the main parts of the bait reel equipped with a turning dial according to a desirable application example of the present invention.
Figure 3:
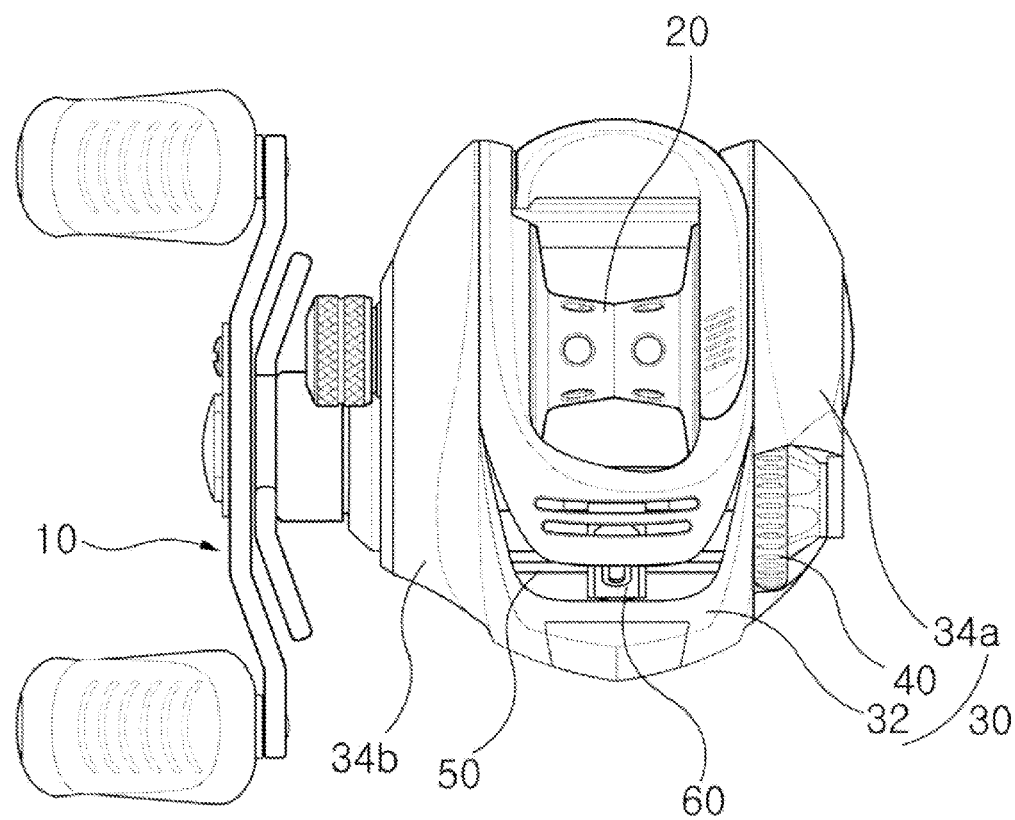
FIG. 3 is a front view of the bait reel equipped with a turning dial according to a desirable application example of the present invention.
Figure 4:
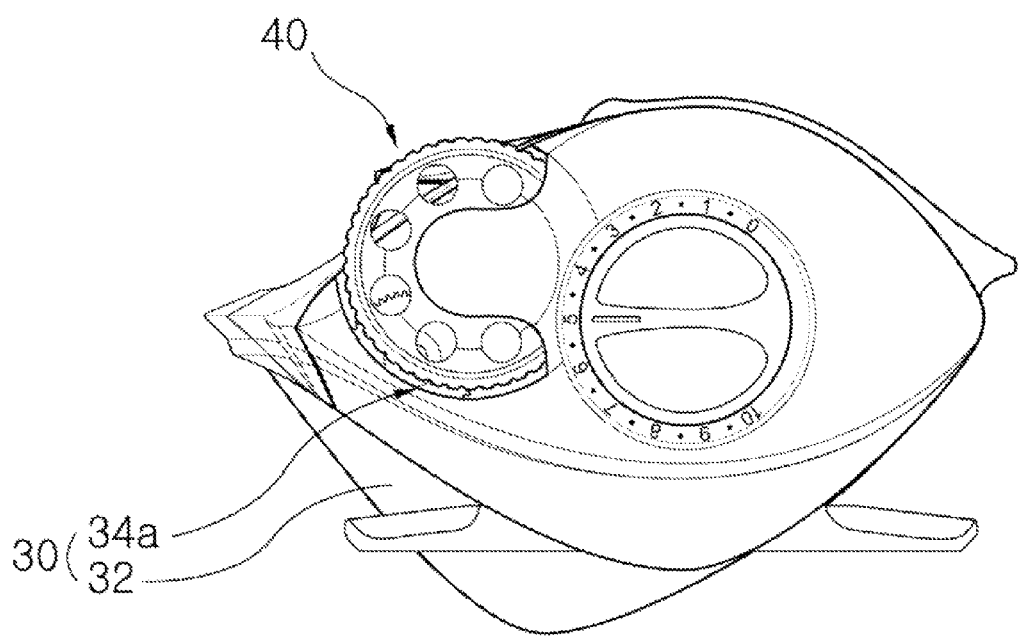
FIG. 4 is a side view of the bait reel equipped with a turning dial according to a desirable application example of the present invention.

FIG. 1 is a drawing showing the main parts of the bait reel equipped with a turning dial according to a desirable application example of the present invention. FIG. 2 is a oblique view for the main parts of the bait reel equipped with a turning dial according to a desirable application example of the present invention. FIG. 3 is a front view of the bait reel equipped with a turning dial according to a desirable application example of the present invention. FIG. 4 is a side view of the bait reel equipped with a turning dial according to a desirable application example of the present invention.

The bait reel equipped with a turning dial according to the present invention comprising a handle (10), a spool (20), a casing (30), a guide support (50), a guide entrance (60), and a turning dial (40).

The handle (10) rotates as the user turns it, and the spool (20) rotates as it reacts to the revolution of the handle (10) because it is equipped with a spool axle (22) connected to the handle axle (12) of the handle, and the fishing line is wounded on and released from the spool (20).

The casing (30), which forms the frame of the bait reel (100), fixes the components of the bait reel (100). Especially, the aforementioned handle (10), spool (20), guide support (50), and turning dial (40) are fixed on the casing in such a way they can rotate.

Here, the casing according to the desirable application example of the present invention comprises the main frame (32) that makes the spool (20) installed in the center, a pair of the side covers (34a, 34b) that makes the external shape of the handle (10) sides. The handle (10) is installed in such a way that it sticks out of one of the side cover (34b), and the turning dial (40) is installed between the main frame (32) and the other side cover (34a) installed on the other side of the handle (10) so that it is located on the opposite side of the handle (10).

Having the shape of a bar, the guide support (50) is installed away from the spool (20) and parallel to the spool axle (22) in the casing (30) in such a way it can rotate. On the both ends of the guide support (50) are the gear steps (52, 54) installed as shown in FIG. 2, and the gear step (54) installed on one end is connected to the connection gear (14) combined with the handle axle (12), and the gear step (52) on the other end is engaged with the connection gear (42) installed on the turning dial (40). Inserted and fixed in such a way that it can slide on the guide support (50), the guide entrance (60) has a hole (62) in it so the fishing line wound on the spool (20) can pass through.

The turning dial has the connection gear on one side which is meshed with the gear steps installed on the other side of the guide support. It is fixed to the casing with a part of it sticking out of the casing with the possibility of revolving against the casing so the user can turn it. In the bait reel equipped with the turning dial according to the present invention, the turning dial rotates the spool as many as the times of the number of the gear cogs of the pinion installed between the handle axle and the spool axle by transmitting the rotary motion of the turning dial is transferred to the handle axle through the guide support.

The guide support (50) and the guide entrance (60) explained above are the ones that make the fishing line wounded on the spool (20) wound or released smoothly and stably through the guide entrance (60) as the guide entrance (60) is sliding on the guide support (50) installed parallel to the spool (20). These guide support (50) and the guide entrance (60) are common components of a fishing reel, so their detailed explanations are omitted here.

The turning dial (40) is fixed to the casing (30) in such a way it can rotate and can be manually rotated as it is sticking out of the casing (30). This turning dial (40) has a connection gear (42) on one side as illustrated in FIGS. 1 and 2, and engaged with the gear step (52) installed on the other end of the guide support (50). As the guide support (50) is connected to the handle axle (12) of the handle (10), the revolution of the turning dial (40) is conveyed to the handle axle (12) through the guide support (50), and at the same time, is further conveyed to spool axle (22) connected to the handle axle (12), revolving the spool (20). In other words, the turning dial (40) enables fine-tuning of the revolution of the spool (20) by rotating the spool (20) as many as the times of the number of the gear cogs of the pinion (24) installed between the handle axle (12) and the spool axle (22) by transmitting the rotary motion of the turning dial (40) to the handle axle (12) through the guide support (50).

Here, the turning dial (40) according to the desirable application example of the present invention is, as explained above, installed between the main frame (32) that makes the casing (30) and the side cover (34a) installed on the opposite side of the handle (10) as shown in FIGS. 3 and 4. Because of this structure, the user can stay away from the handle (10) and stably manipulate the turning dial (40) with the hand that holds the fishing rod without interference of the handle (10).

Also, the turning dial (40), fixed on the side cover (34a) installed on the opposite side of the handle (10), can be detached together with that side cover (34a). Fore this, the side cover (34a) installed on the other side of the handle (10) has a projecting part (342) with a connection groove (344) on its inner side, and the turning dial (40) has a bearing fixing hole (44) in the middle so the bearing (46) for dial can be fixed.

As the bearing (46) for the dial that is fixed in the bearing fixing hole (44) of the turning dial (40) is inserted in the projecting part (342) of the side cover (34a) installed on the other side of the handle (10), and the fixing bolt (48) fixes the bearing (46) for the dial in the connection groove (344) of the projecting part (342), the turning dial (40) is removable from the side cover (34a) installed on the opposite side of the handle (10).

As is explained above, the bait reel (100) equipped with a turning dial according to the present invention has a simple bait reel (100) structure even when the turning dial (40) is added because the turning dial (40) transfers the rotary movement to the spool (20) by being connected to the guide support (50) any normal bait reel (100) is equipped with.

Further, because the removable turning dial (40) is attached to the side cover (34a) installed on the opposite side of the handle (10) as explained above, it can be detached together with the side cover (34a). Therefore, it is simple and easy to change and maintain the turning dial (40).

We illustrated the bait reel with a turning dial according to the application example of the present invention following the above explanations and drawings, however, they are just examples and any engineer in the field will understand that they can be changed and modified within the boundary of the technical ideas of the present invention.

I claim:

1. A bait reel equipped with a turning dial in the bait reel for fishing, characterized in that it includes;

a handle that rotates as a user turns it;

a spool that rotates as it reacts to the revolution of the handle because it is equipped with a spool axle connected to a handle axle of the handle;

a casing where the aforementioned handle and spool are fixed in such a way they can rotate;

a bar-shaped guide support that is installed in the aforementioned casing, away from the aforementioned spool and parallel to the aforementioned spool axle, has gear steps installed on both its ends, and is connected to a connection gear engaged with the handle axle through the gear steps installed on one of its ends;

a guide entrance that has a hole in it where fishing line wound on the aforementioned spool passes through and is inserted and fixed in the guide support in such a way it can slide; and a turning dial that has a connection gear on one side which is meshed with the gear steps installed on the other side of the guide support, and is fixed to the casing with a part of it sticking out of the casing with the possibility of revolving against the casing so the user can turn it, and in that it rotates the spool as many as the times of the number of gear cogs of a pinion installed between the handle axle and the spool axle by transmitting the rotary motion of the turning dial to the handle axle through the guide support, characterized in that the aforementioned casing consists of a main frame that enables the installation of the aforementioned spool in a space formed in its middle and removable side covers that make an outer shape of the bait reel by being attached on both sides of the aforementioned main frame, that the aforementioned handle is installed in such a way that it sticks out of one of the side covers, and that the aforementioned turning dial is removable together with the other side cover as one unit by being fixed to that side cover with the possibility of revolution.

2. The bait reel equipped with a turning dial in claim 1, characterized in that the other side cover has a projecting part with a connection groove on its inner side;

the aforementioned turning dial has a bearing fixing hole in its middle so a bearing for the dial can be fixed;

the aforementioned removable turning dial is fixed to the other side cover installed on the opposite side of the handle as the bearing for the dial that is fixed in the aforementioned fixing hole is inserted in the projecting part of the aforementioned side cover.

3. The bait reel equipped with a turning dial in claim 2, characterized in that a fixing bolt fixes the bearing for the dial in the connection groove of the projecting part of the other side cover.

4. A bait reel equipped with a turning dial for fishing, comprising:

a handle that rotates as a user turns it, a spool that rotates as it reacts to the revolution of the handle because it is equipped with a spool axle connected to a handle axle of the handle, a casing comprising first and second removable side covers, wherein the handle and spool are fixed to the casing in such a way that they can rotate and the handle sticks out of the first side cover, a turning dial fixed to the second side cover with a part of it sticking out of the second side cover with the possibility of revolving so the user can turn it, wherein the turning dial is connected to the handle axle such that turning the turning dial rotates the spool by transmitting rotary motion of the turning dial to the handle axle, wherein the turning dial is removable together with the second side cover as one unit.

5. The bait reel equipped with a turning dial of claim 4, further comprising a guide support installed in the casing, parallel to the spool axle, with gear steps installed on both its ends, wherein the gear steps on one end are connected to the handle axle and on the other end are connected to the turning dial, wherein the rotary motion of the turning dial is transmitted to the handle axis through the guide support.

6. The bait reel equipped with a turning dial of claim 5, wherein the gear steps on one end are connected to the handle axle by a first connection gear and wherein the gear steps on the other end are connected to the turning dial by a second connection gear.

7. The bait reel equipped with a turning dial of claim 4, wherein the casing further comprises a main frame that enables installation of the spool in a space formed in its middle and the removable side covers are attached to both sides of the main frame.

8. The bait reel equipped with a turning dial of claim 4, further comprising a pinion having gear cogs installed between the handle axle and the spool axle.

9. The bait reel equipped with a turning dial of claim 4, wherein the second side cover has a projecting part with a connection groove on its inner side, the turning dial has a bearing fixing hole in its middle and a bearing fixed in the bearing fixing hole, and the bearing is inserted in the projecting part of the second side cover.

10. The bait reel equipped with a turning dial of claim 9, further comprising a fixing bolt fixing the bearing in the connection groove of the projecting part of the other side cover.

11. The bait reel equipped with a turning dial of claim 4, further comprising a pinion having gear cogs installed between the handle axle and the spool axle and a guide support installed in the casing, parallel to the spool axle, with gear steps installed on both its ends, wherein the gear steps on one end are connected to the handle axle and on the other end are connected to the turning dial, wherein the rotary motion of the turning dial is transmitted to the handle axis through the guide support, wherein the gear steps on one end are connected to the handle axle by a first connection gear and wherein the gear steps on the other end are connected to the turning dial by a second connection gear, and wherein the casing further comprises a main frame that enables installation of the spool in a space formed in its middle and the removable side covers are attached to both sides of the main frame.

12. The bait reel equipped with a turning dial of claim 11, wherein the second side cover has a projecting part with a connection groove on its inner side, the turning dial has a bearing fixing hole in its middle and a bearing fixed in the bearing fixing hole, and the bearing is inserted in the projecting part of the second side cover, further comprising a fixing bolt fixing the bearing in the connection groove of the projecting part of the other side cover.

* * * * *